Jan. 22, 1929.　　　　　J. O. ECKER　　　　1,699,692
HEADLIGHT
Filed Aug. 20, 1927
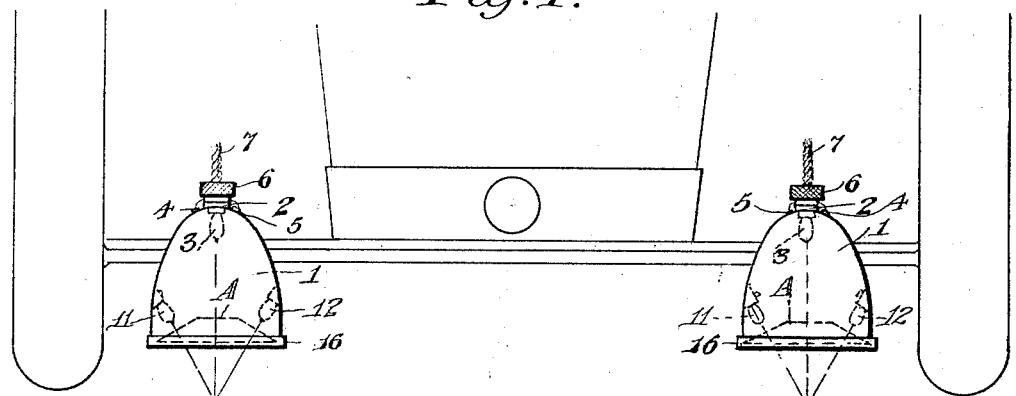
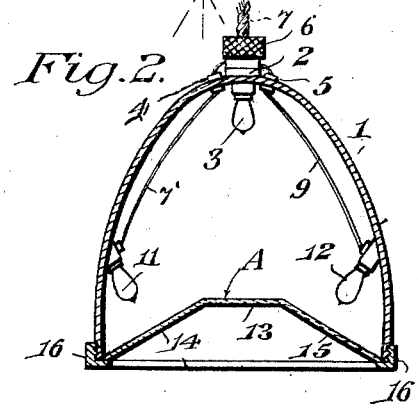
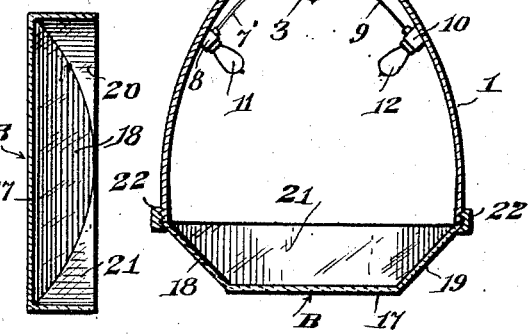
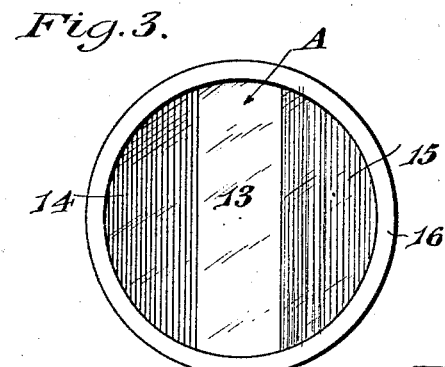
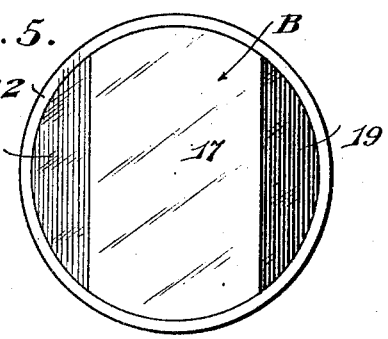
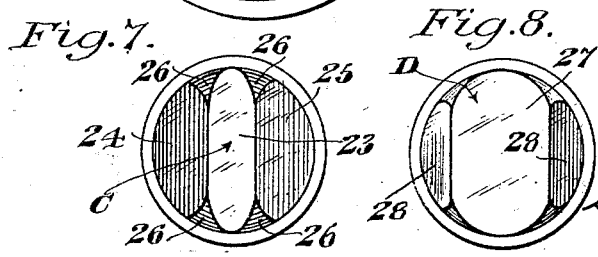
INVENTOR.
J. O. Ecker,
BY Geo. P. Kimmel
ATTORNEY.

Patented Jan. 22, 1929.

1,699,692

UNITED STATES PATENT OFFICE.

JOHN ORVILLE ECKER, OF SAN MATEO, FLORIDA.

HEADLIGHT.

Application filed August 20, 1927. Serial No. 214,348.

This invention relates to headlights for motor vehicles, and has for its object to provide, a device of such class, in a manner as hereinafter set forth for dimming the light rays when the vehicle is travelling to the left or right when rounding curves and further to clearly show to the driver of the vehicle when rounding curves any obstruction in the line of travel whereby accidents are reduced to a minimum.

Further objects of the invention are to provide, in a manner as hereinafter set forth, a headlight for the purpose referred to which is simple in its construction and arrangement, strong, durable, compact, thoroughly efficient in its use, conveniently operated, readily installed with respect to a motor vehicle and comparatively inexpensive to manufacture.

With the foregoing and other objects in view the invention consists of the novel construction, combination and arrangement of parts as more specifically described, and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a top plan view showing the adaptation of a pair of headlights, in accordance with this invention, with a motor vehicle.

Figure 2 is a sectional view of the headlights.

Figure 3 is a front elevation thereof.

Figure 4 is a sectional view of a modified form of headlight.

Figure 5 is a front elevation of the form shown in Figure 4.

Figure 6 is a vertical sectional view of the lens used in connection with the form shown in Figure 4.

Figures 7 and 8 are front elevations of modified forms of lenses employed in a headlight in accordance with this invention.

Referring to the drawings in detail 1 indicates a headlight casing of parabolic contour and having its inner face constituting throughout a reflector. The forward end of the casing 1 is open and its rear end closed and medially of the latter it carries a lamp socket 2 which projects into the casing 1 and has connected therewith, at its inner end, a lamp 3 providing the main light of the device. At each side of the socket 2, the rear end of the casing 1 is formed with a pair of sleeves 4, 5 of insulation material. Connected to the socket 2 is a circuit coupling element 6 having the circuit wires 7 attached thereto. Leading from the element 6 and extending through the sleeve 4 is a circuit connection 7' terminating in a socket 8 and leading from the element 6 and extending through the sleeve 5 is a circuit connection 9 which terminates in a socket 10. The sockets 8, 10 are secured to the inner face of the casing 1 and extend in opposite directions with respect to each other and at an inclination. Attached to the socket 8 and disposed at the same inclination as the inclination of the socket 8, is a lamp 11 which constitutes what is termed a right spot light and attached to the socket 10 and disposed at the same inclination as the inclination of the socket 10 is a lamp 12 and which constitutes a left spot light.

With reference to Figure 2 there is extended across the open front of the casing 1 a concave lens referred to generally at A comprising a central portion 13 which is disposed diametrically and a pair of side portions 14, 15. The portion 13 associates with the lamp 3 and is arranged forwardly thereof and in alignment therewith. The portion 14 associates with the lamp 11 and the portion 15 with the lamp 12. The portions 14, 15 are translucent, whereas the portion 13 is transparent. The casing 1 is provided with a flanged clamping band 16 and said band provides for the clamping of the lens A against the open end of the casing 1. The band 16 overlaps the lens A and threadedly engages with the periphery of the casing 1 at the outer end thereof. In the form shown in Figure 2 the lamps 11, 12 are arranged nearer the outer end of the casing 1, than the position of the lamps 11, 12 as shown in connection with the form of headlight illustrated by Figure 3, and with reference to Figure 3 the lens which is referred to generally by the reference character B is convex in cross section and extends from the open end of the casing 1 and said lens B includes a central portion 17 and a pair of end portions 18, 19. The portion 17 is transparent and the portions 18, 19 are translucent. The portion 17 associates with the lamp 3 and is arranged forwardly of and in alignment therewith. The portion 19 associated with the lamp 11 and the portion 18 associates with the lamp 12. In cross section the lens A will have the portions 14, 15 thereof disposed at opposite inclinations with respect to each other and this arrangement also applies to the portions 18, 19 of the lens B when the latter is in cross section and the arrangement of the portions 14, 15, 18, 19 is at an inclination as shown in Figure 2. The lens B has rearwardly directed flanged portions 20, 20 and which are opaque and said flanged portions are provided in view of the manner of setting the portions 17, 18 and 19 of the lens to close the top and bottom of lens B. The portion 13 of the lens A is vertically disposed and extends from the bottom to the top edge of the lens body and furthermore is inset with respect to the forward end of the casing 1. The portion 17 of the lens B is vertically disposed and extends from the top to the bottom thereof and is further offset forwardly with respect to the open end of the casing 1. The lens B is secured in position, with respect to the open end of the casing 1, by an interiorly threaded flanged band 22 which threadedly engages with the casing 1 and overlaps the lens B, as shown in Figure 3.

The transparent portion 13 of the lens A, is of less width than the transparent portion 17 of the lens B, but the translucent portions 18, 19 of the lens B are of less width than the width of the translucent portions 14, 15 of the lens A. The translucent portions 14, 15 extend from the top to the bottom of the lens A and also to the edge thereof and this arrangement is also had in connection with the translucent portions 18, 19 of the lens B.

In Figure 7 the lens is generally indicated at C and includes a central transparent portion 23 and a pair of translucent portions 24, 25 and also with opaque portions 26. The difference between the lens shown in Figure 7 and that shown in Figures 2 and 4 is that the transparent portion 23 has rounded ends and the translucent portions 24, 25 also have rounded ends.

In the form of lens shown in Figure 8, it is the same as that shown in Figure 7, with this exception that the transparent portion 27 of the lens is of greater width than the transparent portion 23 of the lens C and further that the lens D shown in Figure 8 has the translucent portions 28 of less width than the translucent portions 24, 25 of the lens C. The lens C shown in Figure 6 is concave and the lens D shown in Figure 8 is convex.

The translucent portions provide for the dimming of the light rays from the lamp 3 and the spot lights assist in the showing of an obstruction on the road when the automobile or vehicle is travelling to the left or to the right around a corner or curve. The spot lights 11, 12, in connection with the translucent portions also coact to dim the light rays which are projected from the casing 1.

The setting up of a headlight, to include a lens in accordance with this construction and with the lens combined with the lamps as illustrated, provides means for dimming the light rays when the vehicle is travelling to the left or to the right when rounding corners and further to clearly show to the driver of the vehicle any obstruction in the line of travel under such conditions reducing accidents to a minimum, and therefore it is thought the many advantages of a headlight, in accordance with this invention, can be readily understood, and although the preferred embodiment of the invention is as illustrated and described, yet it is to be understood that changes in the details of construction can be had which fall within the scope of the invention as claimed.

What I claim is:

1. In a headlight, a one-piece lens comprising a diametrically extending flat central transparent portion and a pair of translucent side portions inclining in opposite directions from said central portion.

2. In a headlight, a parabolic reflector, a lens attached to the outer end thereof, formed of a flat central transparent portion and a pair of translucent side portions inclining in opposite directions from said central portion, a lamp disposed axially of and at the inner end of the reflector and projecting forwardly from said end, and a pair of opposed, inclined, oppositely extending lamps projecting from the sides of the reflector and positioned forwardly of said other lamp.

3. In a headlight, a parabolic reflector, a lens attached to the outer end thereof, formed of a flat central transparent portion and a pair of translucent side portions inclining in opposite directions from said central portion, a lamp disposed axially of and at the inner end of the reflector and projecting forwardly from said end, and a pair of opposed, inclined, oppositely extending lamps projecting from the sides of the reflector and positioned forwardly of said other lamp, each lamp of said pair of lamps disposed in a plane intersecting respectively the opposite side portion of the lens.

In testimony whereof, I affix my signature hereto.

JOHN ORVILLE ECKER.